United States Patent Office 3,502,509
Patented Mar. 24, 1970

3,502,509
SILVER CATALYZED FUEL CELL ELECTRODE
John F. Sindorf, West Allis, Wis., assignor to Allis-Chalmers Manufacturing Company, Milwaukee, Wis.
No Drawing. Filed May 23, 1966, Ser. No. 551,891
Int. Cl. H01m 13/06, 35/22
U.S. Cl. 136—120     5 Claims This invention relates to electrochemical cells known as fuel cells. More particularly, this invention relates to new and useful electrode structures for use in fuel cells and like apparatus. In particular, this invention deals with improved silver electrodes and to methods of fabricating such electrodes.

The term fuel cell, as used herein, refers to those electrochemical devices that convert the free energy of a chemical reaction directly to electrical energy. Such devices are well known in the art and although there are differences between various cells, a discussion of some of their common characteristics will aid in the understanding of my invention.

As is known, oxidation-reduction reactions are accompanied by the transfer of electrons from the reductant to the oxidant. In individual fuel cells, the oxidation reaction and reduction reaction takes place at spacially separated electrodes. At each electrode there occurs what is called a half-cell reaction. One electrode, called the anode, is the site of the oxidation half-cell reaction. A reactant, referred to as the fuel, that is oxidizable with respect to some oxidant is supplied by suitable means to the anode, and is thereat electrochemically oxidized. Oxidation of the fuel releases electrons to the anode. At the other electrode, called the cathode, spaced apart from the anode by a suitable electrolyte, the other half-cell reaction simultaneously takes place. A reactant called the oxidant, reducible with respect to the fuel, is supplied by suitable means to the cathode, and is thereat electrochemically reduced. This reaction takes up electrons from the cathode.

These two half-cell reactions result in the cathode tending to have a deficiency of electrons and the anode to have an excess. This tendency is relieved by the transfer of charge electronically through an external circuit connecting the electrodes, accompanied by the ionic transfer of charge through electrolyte. The current produced in the external circuit can do useful work. Production of current will continue so long as fuel and oxidant are supplied and waste products exhausted.

The voltage of the individual fuel cell is limited by the theoretical free energy change ($\Delta F$) for the reaction at the fuel cell operating temperature. The amperage of the cell is determined by the rate of reaction and the size of the cell. In practice, several individual fuel cells are coupled in cooperative electrical connection to obtain the desired output. A plurality of cells so connected is known as a module.

The electrode of the present invention is particularly suitable in those fuel cells having oxygen or air oxidant supplied to the electrode surface remote from the electrolyte. The oxidant diffuses through the porous electrode until it meets the electrolyte at a three phase boundary of electrode, oxidant, and electrolyte.

In order for the oxidant to react at this boundary, it must first become activated. Activation of the oxidant is especially important because it is believed that the rate of activation of oxidant at the cathode is the rate limiting reaction in a fuel cell. Activation has been achieved by heat, pressure, and for low temperature reaction, by catalysts. Silver has been known and used as an oxidant activation catalyst.

In my copending patent application, Ser. No. 366,737, entitled "Fuel Cell Electrode and Method of Making Same," filed May 12, 1964, and now abandoned, there is disclosed a method for producing a fuel cell electrode wherein a reducible metal salt selected from the group consisting of nickel and silver is first reduced with a reducing agent such as hydrazine in a suitable reaction medium such as water to form a flocculent precipitate of the metal particles. The metal particles are then admixed with an aqueous emulsion of a polymeric resin such as polytetrafluoroethylene forming a discontinuous coating about each of the particles. The coated particles are dried and then compressed into a cohesive mass to form the fuel cell electrode.

It has now been found that the properties of these electrodes formed from compressed resin coated silver particles can be improved in accordance with the method of the present invention wherein the silver particles are precipitated by admixing a solution of a reducible silver salt heated to a temperature between about 50° C. to about the boiling point of the silver salt solution with a solution of a reducing agent cooled to a temperature below the freezing point of the reducing agent solution. The resultant metallic silver precipitate has a very high surface area and electrodes formed from the silver particles precipitated in this manner have improved power outputs.

The heated silver salt solution may be admixed with the frozen solution of the reducing agent in any particular manner. However, it has been found most convenient to pour the heated solution of the silver salt into the cooled solution of the reducing agent.

Liquids that are suitable for preparing solutions of the silver salt and reducing agent are liquids that can solvate both the silver salt and the reducing agent. For most applications of my process, water has been found the most convenient, inexpensive and hence desirable reaction medium.

Suitable reducible silver salts which may be used in the process of the present invention include silver nitrate, silver acetate, silver citrate and silver lactate. Generally any water soluble silver salt or a silver salt soluble in the particular liquid chosen as the reaction medium for the reduction of the silver may be employed.

Agents for reducing silver in the plus 1 oxidation state, are well known and include the alkali borohydrides, such as sodium borohydride, potassium borohydride and lithium borohydride, formaldehyde, hydrazine, hydrazine hydrochloride, alkyl substituted hydrazines, or reducing sugars such as dextrose. Among these reducing agents, hydrazine has been found to yield a particularly flocculent precipitate having a high surface area.

As soon as the reducing agent contacts the solvated salt, a reaction ensues whereby the silver is reduced to the metal. In order to obtain a flocculent precipitate, an excess of the reducing agent is preferable. The term excess is used herein to describe that quantity over and above the amount theoretically needed to reduce the silver, i.e., the stoichiometric amount. In the case where hydrazine is used as the reducing agent, a two-fold to five-fold excess of hydrazine will suffice to produce the desired flocculent precipitate.

When precipitation is complete, the metal particles are separated from the supernatant mother liquor. Means to carry out this separation are apparent to one skilled in the art, e.g., decantation, and filtration. Whatever means is used, care should be taken not to compact the metal particles because it has been found that an inferior electrode material will result.

After the mother liquor has been separated, the metal is washed with water to remove any reaction residue. Washing is continued until the dishwater has a neutral pH.

When the washing is completed, most of the water is decanted or filtered off. If further treatment is to be delayed, the metal particles are best stored in the wet condition. While drying at this time is permissible, it generally yields an inferior electrode.

Following the washing of the metal precipitate, a fuel cell electrode may be prepared from the precipitated silver particles by treating the particles with an emulsion of a thermoplastic resin to form a discontinuous film about each of the particles. The treated particles are then compressed together to form a cohesive fuel cell electrode. The term "discontinuous" is meant to include a porous coating of thermoplastic to the metal particles as well as a coating of discrete particles. The film surrounding the silver particles must be discontinuous, otherwise there would be no metal available as a reaction site. The application of the resin in the form of an emulsion prevents the formation of a continuous film that would bar contact between electrolyte-catalyzed electrode surface and reactant. Emulsion as that term is used herein is intended to define both solid in liquid and liquid in liquid emulsions including aqueous dispersions of colloid size particles such as polytetrafluoroethylene (Teflon 41–BX), polychlorotrifluoroethylene and the like. Also suitable are resins which are inert to any destructive chemical action of electrolyte or reactant such as the polyolefins exemplified by polyethylene, polypropylene, and polystyrene. Such resins may either be emulsified finely divided particles in an aqueous dispersion or an aqueous emulsion of the polymer dissolved in a suitable solvent, e.g., polystyrene in benzene, and emulsified with a wetting agent such as an alkaryl polyether alcohol.

The emulsion is poured over the metal particles and the excess drained off. The emulsion should contact each particle. To this end, the metal particles may be soaked in the emulsion for a few moments, and agitated slightly to eliminate any air pockets. The coated particles are then dried at about 200° F. to evaporate the aqueous phase of the dispersion and any solvent for the polymer. Of course, room temperature drying is feasible if time permits.

After drying, the resin coated metal particles become a free flowing powder, and are ready for compression into a fuel cell electrode.

The compression can be suitably accomplished by feeding the powder to heated calendar rolls, extruding through a die or compression in a die. Compression is preferably accomplished by placing the powder in a ram press and compressing to the desirable thickness.

When the electrode is formed, it is ready for installation in a fuel cell. Often, however, especially with fluorocarbon resins, it is desirable to subject the electrode to a heat cure at a temperature just above the softening point for the resin. With polytetrafluoroethylene resin, the electrode is heated to 675° F. and held at that temperature for 3 to 5 minutes.

The following example is illustrative of the practice of the invention.

EXAMPLE

Five hundred grams of $AgNO_3$ were dissolved in 2 liters of water and the solution heated to 93° C. A second solution of 0.2 liter of hydrazine hydrate and 1.8 liters of water was cooled to −24° C. to prepare a frozen solid solution. The heated solution of $AgNO_3$ was poured into a vessel containing the frozen solution of hydrazine hydrate. A tan, flocculent precipitate resulted. The precipitate was separated and washed with water until the wash water tested neutral (pH 7). The excess wash water was then decanted from the precipitate.

A previously prepared mixture of 1 part Teflon 41–BX a polytetrafluoroethylene dispersion (containing approximately 35 percent solids) and 1 part water respectively by volume containing 5 cc. of a 3:1 aqueous solution of Triton X–100 per 100 cc. of the above diluted Teflon dispersion was added to the wet silver precipitate. Triton X–100 is a trademark for isooctyl phenoxy polyethoxy ethanol. This admixture of silver and Teflon emulsion was stirred to bring all the silver particles in contact with the emulsion. The excess emulsion was then poured off. Following this, the Teflon treated silver was then spread into a shallow tray and dried in a draft oven at 200° F. After drying, 18 grams of the Teflon treated silver powder was placed in a 3½ by 3½ inch boat and struck level. A 3¼ by 3¼ inch 20 mesh nickel screen having 15 mil wire was placed over the powder. The powder was then compressed in a ram press to a thickness of 23 mils. After pressing, the electrode was sintered at 675° F. for five minutes.

The resulting electrode was installed as the cathode in a hydrogen-oxygen fuel cell having a 20–20 platinum-palladium catalyzed anode operated at 70° C. The electrolyte was 30 percent aqueous potassium hydroxide. The voltage-amperage data obtained for the cell is summarized in Table I below:

TABLE I

| Amperes per square foot: | Volts |
|---|---|
| 80 | 0.85 |
| 160 | 0.76 |
| 200 | 0.72 |
| 240 | 0.70 |

By way of contrast, an electrode was prepared in an identical manner with the exception that the silver precipitate was obtained by admixing crystalline $AgNO_3$ simultaneously with hydrazine hydrate in water maintained at a temperature of 16° C.

The electrode was installed as the cathode in a hydrogen-oxygen fuel cell having a 20–20 platinum-palladium catalyzed anode operated at 70° C. The electrolyte was 30 percent aqueous potassium hydroxide. The voltage-amperage data obtained for the cell is summarized in Table II below.

TABLE II

| Amperes per square foot: | Volts |
|---|---|
| 80 | 0.85 |
| 160 | 0.75 |
| 200 | 0.70 |
| 240 | 0.68 |

From a comparison of the voltage-amperage data provided in Tables I and II above, it is readily apparent that the power output of the electrode prepared in accordance with the present invention (Table I) is substantially improved when compared with an electrode prepared in a manner outside the scope of the present invention (Table II).

The embodiments of the invention in which an exclusive property or privilege is claimed are defined as follows:

1. A process for producing a fuel cell electrode comprising the steps of: reducing a silver salt to flocculent silver particles by admixing a solution of the silver salt heated to a temperature between about 50° C. to about the boiling point of the solution with a solution of a reducing agent cooled to a temperature below the freezing point of the solution of reducing agent, coating said silver particles with a discontinuous film of a polymeric resin, and compressing the particles into a cohesive mass to form a fuel cell electrode.

2. The process of claim 1 wherein an aqueous solution of the silver salt is admixed with a frozen solution of hydrazine.

3. The process of claim 1 wherein the silver salt is $AgNO_3$.

4. The process of claim 1 wherein the silver particles are coated with discontinuous film of polytetrafluoroethylene.

5. The process of claim 1 wherein the silver particles are coated with an aqueous emulsion of polytetrafluoroethylene.

References Cited

UNITED STATES PATENTS

| | | | |
|---|---|---|---|
| 3,248,267 | 4/1966 | Langer et al. | 136—86 |
| 3,287,171 | 11/1966 | Holt | 136—120 |

FOREIGN PATENTS 1,296,819  5/1962  France.

OTHER REFERENCES

Mullin, J. W.: Crystallization, London, Butterworths, (1961), pp. 165, 166, applied.

WINSTON A. DOUGLAS, Primary Examiner

O. F. CRUTCHFIELD, Assistant Examiner

U.S. Cl. X.R.

75—118; 264—125